Sept. 28, 1954  F. A. HASSMAN  2,690,097
TRIP CONTROL MECHANISM
Filed July 11, 1952  3 Sheets-Sheet 1
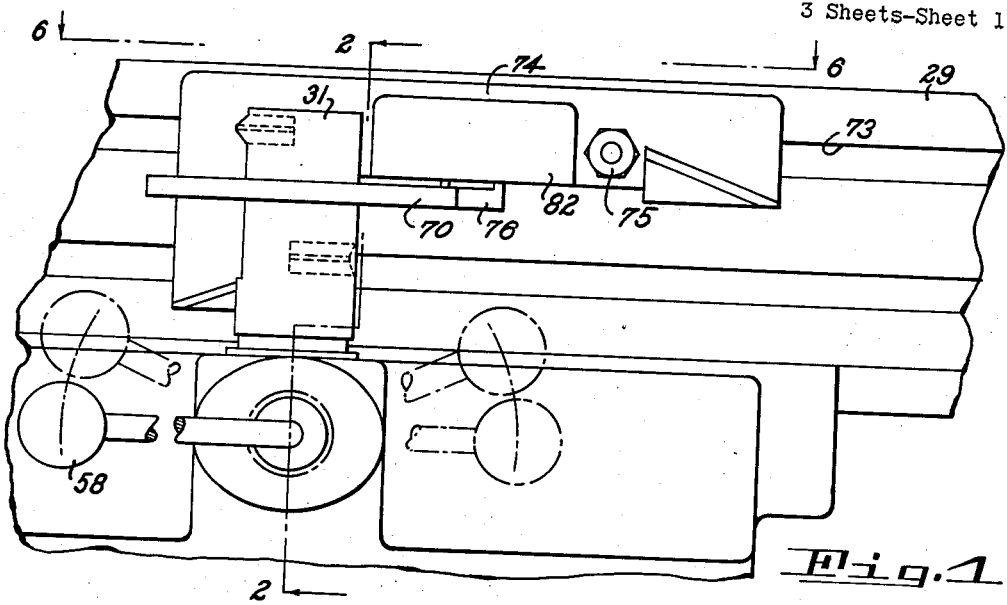
Fig.1
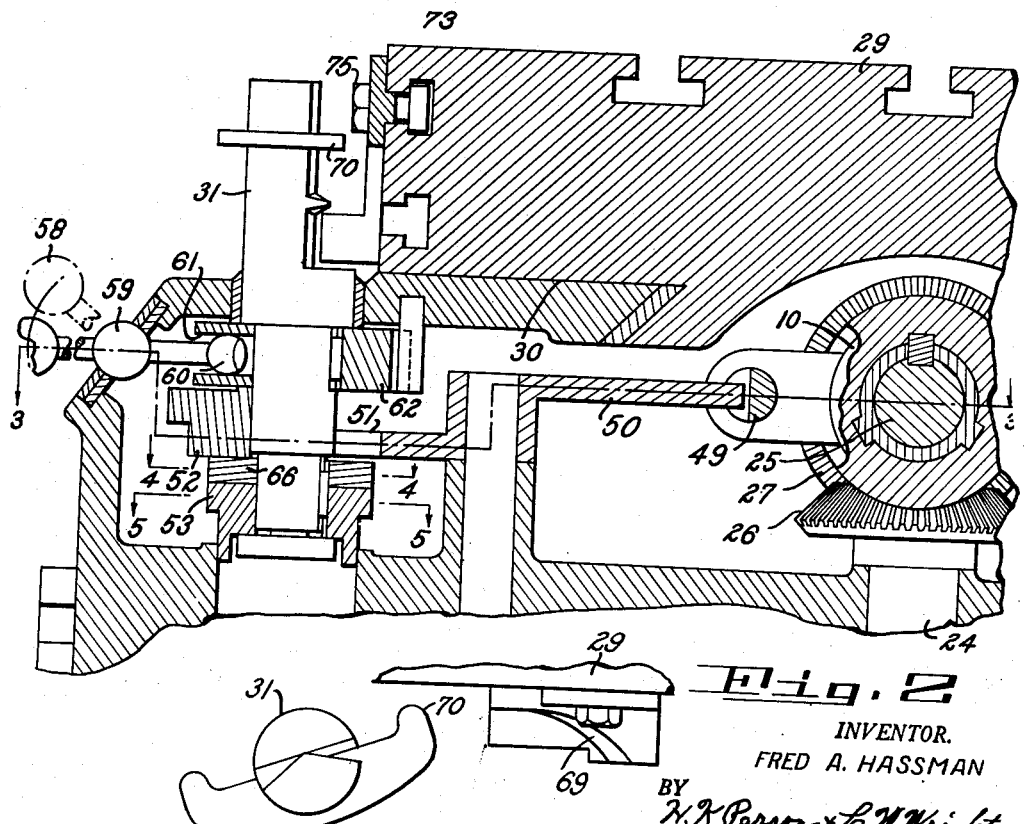
Fig.2
Fig.12
INVENTOR.
FRED A. HASSMAN
BY
H. K. Parsons & C. W. Wright
ATTORNEYS.

Sept. 28, 1954　　　　　F. A. HASSMAN　　　　　2,690,097
TRIP CONTROL MECHANISM
Filed July 11, 1952　　　　　　　　　　　　3 Sheets-Sheet 2
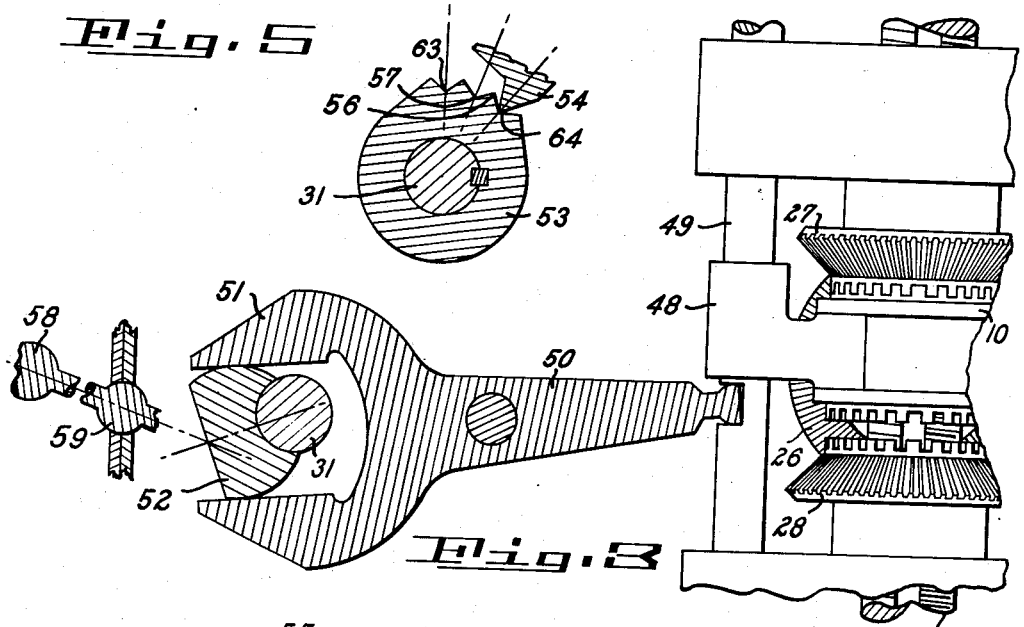
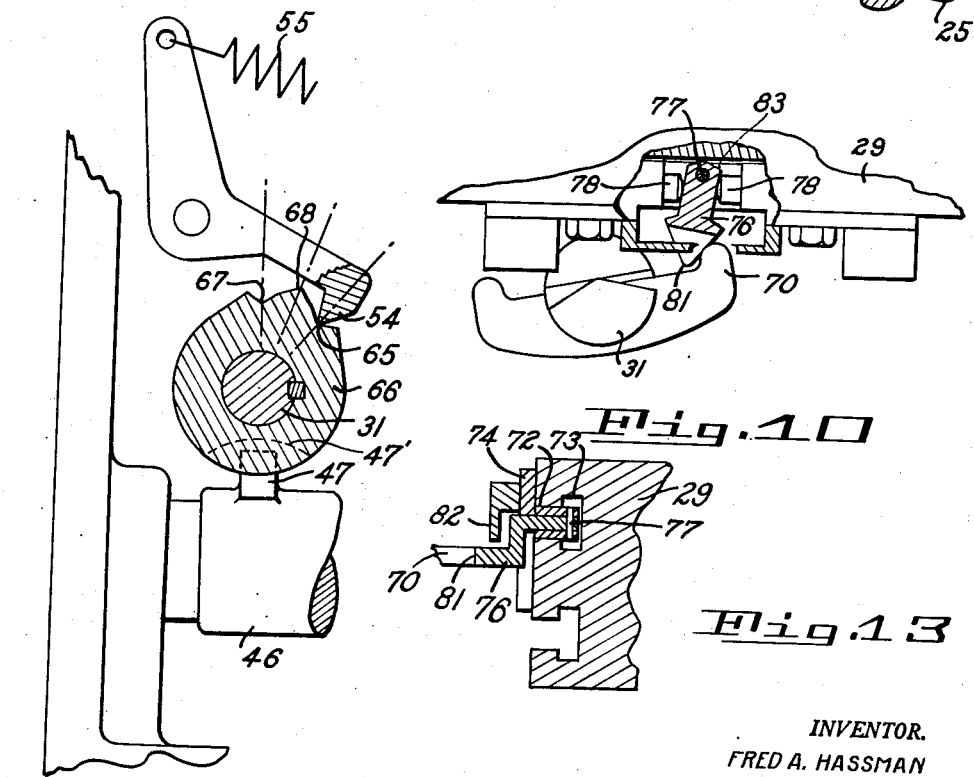
INVENTOR.
FRED A. HASSMAN
BY
H. K. Parsons + L. W. Wright
ATTORNEYS.

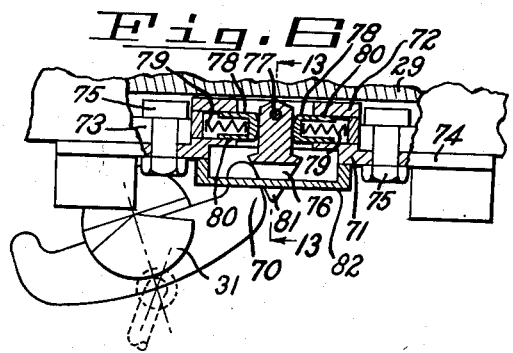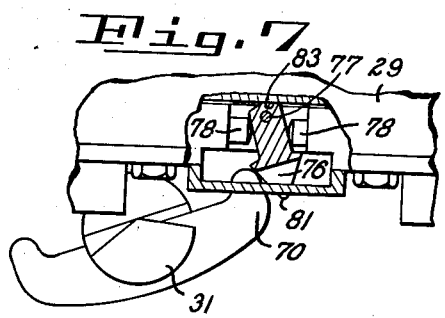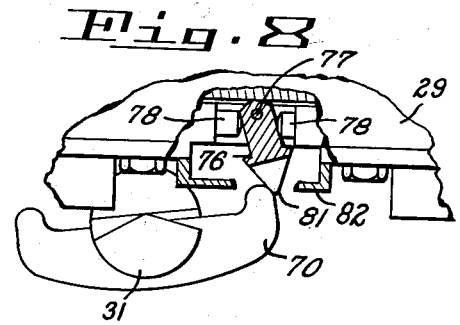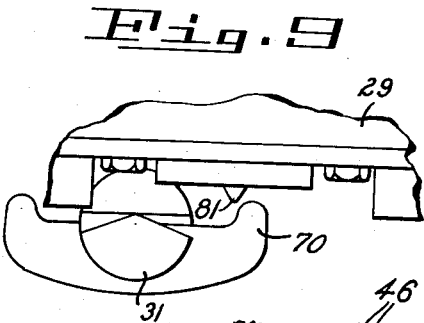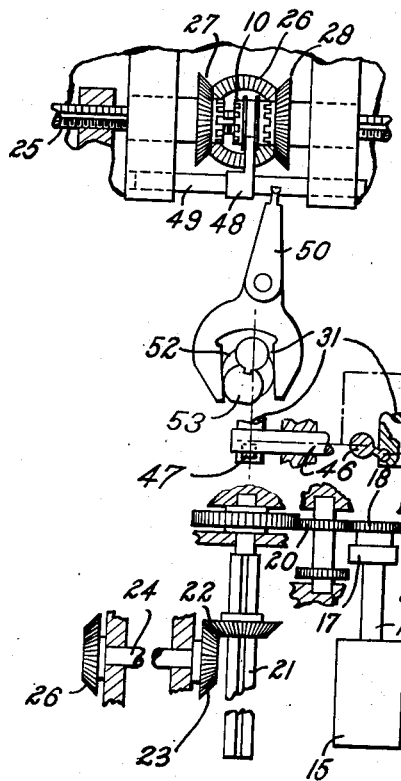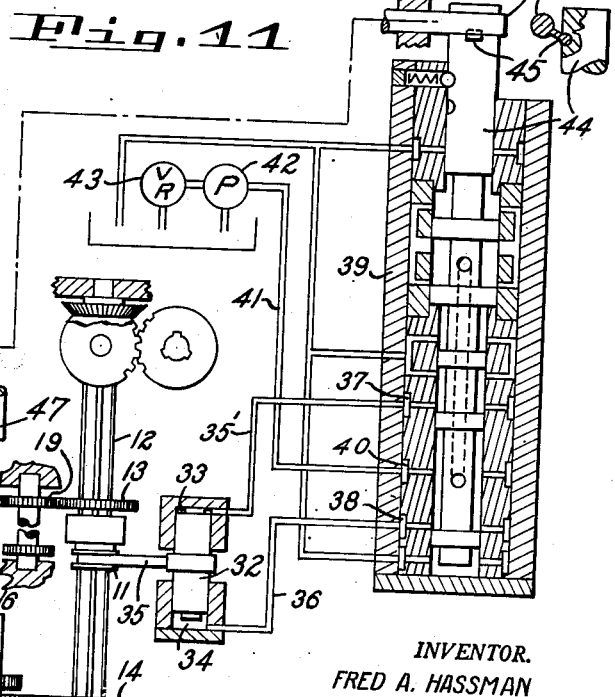

Patented Sept. 28, 1954

2,690,097

UNITED STATES PATENT OFFICE 2,690,097

TRIP CONTROL MECHANISM

Fred A. Hassman, Cincinnati, Ohio, assignor to The Cincinnati Milling Machine Co., Cincinnati, Ohio, a corporation of Ohio Application July 11, 1952, Serial No. 298,304

5 Claims. (Cl. 90—21)

This invention relates to machine tools and more particularly to improvements in trip control mechanisms therefor.

This invention is an improvement of that shown in Letters Patent 2,393,928, and one of the objects of this invention is to increase the repertoire of cycles which may be obtained automatically with the mechanism shown in the patent.

Due to the many functions which have been combined in the single trip control plunger of the mechanism shown in the patent, it becomes impossible when the table cycle is stopped automatically in the midst of its travel in a given direction to restart movement of the table in the same direction. Therefore, another object of this invention is to overcome this inadequacy and provide a mechanism whereby an automatic intermediate stop during cyclic travel of the table in a given direction may be obtained without locking up the parts so that the operator may restart the cycle movement in the same direction.

A further object of this invention is to increase the utility of said mechanism by making new cycles of automatic operation available.

Other objects and advantages of the present invention should be readily apparent by reference to the following specification, considered in conjunction with the accompanying drawings forming a part thereof, and it is to be understood that any modifications may be made in the exact structural details there shown and described, within the scope of the appended claims, without departing from or exceeding the spirit of the invention.

Referring to the drawings in which like reference numerals indicate like or similar parts:

Figure 1 is a front elevation of a portion of a milling machine table and its support showing the relationship of the trip elements of this invention.

Figure 2 is a vertical section on the line 2—2 of Figure 1.

Figure 3 is a horizontal section on the line 3—3 of Figure 2 showing the table reversing clutch and actuating mechanism therefor.

Figure 4 is a section on the line 4—4 of Figure 2 showing the two position detent mechanism.

Figure 5 is a section on the line 5—5 of Figure 2.

Figure 6 is a plan view showing the stop dog about to engage the trip plunger as the table moves toward the left.

Figures 7, 8, 9, and 10 are views showing different rotatable positions of the trip plunger as the table progresses in its movement.

Figure 11 is a diagrammatic view of the table transmission mechanism.

Figure 12 is a view of a prior art dog used for reversing.

Figure 13 is a detail section on the line 13—13 of Figure 6.

This invention deals broadly with automatic cyclic control of a movable slide of a machine tool, such as the table of a milling machine shown in the patent supra, which is driven by a transmission which briefly may be described as a feed-rapid traverse transmission.

For a clearer understanding of the invention it is desired to point out that in the disclosure of the patent supra there is a single trip control plunger acting as an intermediate agent between the traveling trip elements on the table, and the transmission control parts for translating the motion received from the traveling elements into positioning movements of the control parts, such as clutches of the transmission, to automatically produce changes in the rate and direction of movement of the traveling table.

The transmission is of the type diagrammatically indicated in Figure 11, and the reference numeral 10 indicates the shiftable reversing clutch which controls direction, and the reference numeral 11 indicates the rate determining clutch. Power for driving the table through these clutches is derived from a constantly running shaft 12 which supports a gear 13, known as the rapid traverse drive gear, and adapted to be connected to the shaft 12 by the shifting of clutch 11; and a gear 14 secured to the shaft 12 and known as the feed drive gear. The gear 14 drives, through a variable feed transmission 15 of any suitable type, an output feed shaft 16 that is connected through an overrunning clutch 17 to a gear 18. Thus, the gear 18 is constantly driven in one direction at all times by the shaft 12. However, when the clutch 11 is engaged, the gear 18 is driven at a faster rate by the rapid traverse gear 13 which is connected thereto through intermediate gearing, indicated generally by the reference numeral 19. This is possible because the gear 18 is connected to the shaft 16 by the overrunning clutch 17. The gear 18 drives, through intermediate gearing represented by the reference numeral 20, a spline shaft 21 which is connected to a pair of bevel gears indicated by the reference numeral 22. The driven gear 23 of this pair is attached to the lower end of a shaft 24 which is centrally positioned, as shown in Figure 2, beneath the table drive screw 25 so that the bevel gear 26 attached to the other end of the shaft 24 intermeshes with bevel gears 27 and 28 supported co-axially of the screw 25.

The reversing clutch 10 is splined on the screw 25 and has clutch teeth on opposite sides for engagement with corresponding clutch teeth on the opposing faces of the gears 27 and 28 whereby engagement with the gear 27 will drive the screw in one direction, and engagement with the gear 28 will cause the screw to be driven in the opposite direction.

A trip plunger, which acts as the intermediate agent between the trip elements carried by the table 29 slidable on guideways 30, and the transmission elements, is indicated by the reference numeral 31 as more particularly shown in Figures 1 and 2. The rapid traverse clutch 11 is operatively connected to the trip plunger through the following mechanism. A piston member 32 in Figure 11 is slidably mounted in opposed cylinders 33 and 34, and is operatively connected to the clutch member 11 by a shifter fork 35. Thus, by admission of fluid pressure to the cylinder 33 the clutch is disengaged and upon admission of pressure to the cylinder 34 the clutch is engaged. The cylinders 33 and 34 are connected by channels 35' and 36 to ports 37 and 38 respectively of a rapid traverse control valve 39. This valve has a pressure port 40 which is supplied through channel 41 by a suitable pump 42 having a relief valve 43. A valve plunger 44 is slidably mounted in the valve housing 39 for alternatively connecting the pressure port 40 to the motor ports 37 or 38. The plunger 44 is operatively connected to rod 46 by a crank 45 on the side of rod 46 which, as diagrammatically indicated in Figure 11, is connected by a second crank 47 on the other end of the rod to the trip plunger 31. The actual construction is more particularly shown in Figure 4 in which the lug or crank 47 on the shifter rod 46 fits in a socket 47' in the periphery of the trip plunger 31 whereby a predetermined axial movement of the plunger 31 will cause rotation of the shifter rod 46 to operate the rapid traverse clutch.

The reversing clutch 10, as shown in Figure 3, has a shifter fork 48 which is slidably mounted on a shifter rod 49 which, in turn, is connected by a lever 50 to the trip plunger 31. In this case, the lever 50 is provided with a bifurcated end 51 which embraces a cam member 52 keyed to the trip plunger 31 without lost motion whereby as the trip plunger is rotated the lever will move in unison therewith. At this point it should be pointed out that the trip plunger is capable of both axial and rotatable movement, and it will be noted from Figure 11 that the axial movement causes shifting of the valve plunger 44, and from Figure 3 that rotatable movement causes shifting of the reversing clutch.

It is, of course, desirable that suitable detent mechanism be provided for holding the trip plunger in definite positions, and in Figure 5 is shown a three-position detent member 53 which is keyed to the plunger 31 which cooperates with a detent pawl 54 which is spring actuated by a spring 55 as shown in Figure 4. It will now be seen that as the trip plunger is rotated in a clockwise direction as viewed in Figures 3 and 5, that the reversing clutch 10 will be moved out of engagement with the gear 27, and when the pawl rides over the peak 56 it will snap into the notch 57 and thereby disengage the clutch, or, in other words, move it to a neutral or stop position. Since this will disconnect power from the lead screw, the table will stop and further rotation of the trip plunger will cease. It then becomes necessary for the operator through the medium of the manual control lever 58, which has a ball pivot 59, as shown in Figure 2, to shift the plunger in a desirable direction to reengage the clutch when further movement of the table is desired. The ball pivot is intermediate the length of the manual control lever, and has a ball end 60 which fits in a socket 61 of the member 62 which is keyed to the plunger 31. By means of this construction the operator is enabled to rotate the plunger, or move it axially by proper manipulation of the lever 58. The various positions to which the lever may be moved are shown in Figure 1. The detent member 53 is provided with another notch 63 which holds the trip plunger in position when the clutch 10 is shifted into engagement with the gear 28.

When the trip plunger is in engagement with either notch 63 or 64, shown in Figure 5, it may be moved axially downward to change the rate of support movement by causing engagement of the rapid traverse clutch 11. In so doing, the pawl 54 will slide out of engagement with the notch 64 of detent member 53 and into engagement with a notch 65 in a second detent member 66 attached to the plunger 51. Or, if the detent pawl 54 is in engagement with the notch 63 in member 53 it will slide out of engagement with the second notch 63 and into engagement with a notch 67 in the member 66. However, when the pawl 54 is in engagement with the notch 57 shown in Figure 5, the trip plunger cannot be moved downward because the pawl 54 will be in interference with the peak 68 located between the notches 65 and 67.

In the construction shown in the patent a concave-shaped dog 69, such as shown in Figure 12, is utilized for engagement with the wing 70 of the plunger 31 to rotate the plunger to a stop position. This type of dog, however, can only be used at the end of a table stroke to move the plunger to a stop position for the following reasons. The dog wedges itself under the wing in rotating the wing to the stop position so that it prevents reverse rotation of the wing back to its original position. Thus, after the table has stopped, it is not possible to start it moving again in the same direction. It will thus be seen that an automatic stop can only be effected at the end of a table stroke because at that time the table is reversed anyway.

However, in automatic milling operations where fixtures are spaced on the table and the table reciprocates back and forth to alternately engage work in the respective fixtures, it is common practice for the operator to change the work in one fixture while the cutter is machining the work piece in the other fixture. Under these conditions it is desirable for safety reasons that after the cutter has finished on one work piece and the table has been reversed to move toward the other fixture, that the travel of the table be halted midway between the fixtures to insure that the operator has completed the work changing operation. A dog, such as 69, would be inoperative for this purpose because the table could not be started again in the same direction because of interference with the dog.

By means of this invention, a tripping means has been provided for overcoming this difficulty. Referring to Figure 6, a dog construction is shown comprising an elongated housing, indicated generally by the reference numeral 71 having a rear portion 72 which is made narrow enough to slide into the T slot 73 formed in the front face of the table 29, and a front plate portion 74 which is made much wider so as to provide for the drilling of holes to receive T bolts 75 by which the housing is secured in desired location along the length of the table.

A trip pawl 76 is mounted within the housing and is pivotally connected thereto by a pin 77 located in the narrow portion 72 as far back as possible to allow a reasonable amount of swing to the pawl 76. In front of the pin 77 and on opposite sides of the pawl are mounted a pair of spring pressed equalizing plungers 78 which are continuously urged by springs 79 to hold the pawl in a normal central position. The plungers are slidable in bores 80 formed in the housing. The pawl 76 has a right angle bend, as shown in Figure 13, by which it extends downward, and at the lower end is provided with a V-shaped extension 81. The pawl is so proportioned that the V-shape extension lies in line with the wing 70 of the trip plunger 31 when the trip plunger is axially positioned in its feed position. When the trip plunger is moved axially to its rapid traverse position the wing will be out of line with the trip pawl, and the table will pass by the same without interference. The housing is provided with a shroud or skirt portion 82 which covers and protects the pawl from chips and dirt which might fall from the table and interfere with the operation of the trip pawl.

Attention is invited to the fact that the pawl has a double bevel 83 on its rear end as shown in Figure 10 adjacent the back wall of the T slot to limit the angle of rotation of the pawl. In operation, the trip pawl 76 is secured to the table in the desired longitudinal position thereof, and Figure 6 shows the table and pawl moving to the left with the pawl just engaging the wing 70 of the trip plunger which must be axially located in the feed position. If it is not, then it must be moved to that position by another dog before the pawl 76 can engage the wing 70.

In Figure 7, the table has continued its movement a predetermined amount and thereby rotated the pawl until its beveled rear end 83 prevents further movement. This stops further rotation of the pawl and causes it to wedge the wing 70 into rotative movement, which will continue to the position shown in Figure 8. At this time the detent 54 shown in Figure 5 has ridden to the top of the peak 56 and is ready to fire as it passes over the peak. The firing operation rotates the trip plunger to the position shown in Figure 9. It should be noted that in so doing the wing cleared the pawl, and the centralizing springs came into operation to reposition the pawl in its central position. This stops the table, and it will be noted that the tip 81 of the pawl is now past the end of the wing 70. When the operator is ready for the table to continue, he moves the control lever 58, shown in Figures 1 and 2, to rotate the trip plunger back to its original position shown in Figure 6, and in so doing, the wing may rotate the pawl in the other direction if there is interference as shown in Figure 10. As the table progresses in its travel, the pawl will return to its normal position automatically by action of the centralizing springs. The operator may follow through after moving the trip plunger to engage the feed clutch, and effect axial movement of the plunger to position the parts in a rapid traverse position.

It will be obvious that the tripping pawl 76 will operate in the same manner when the table is traveling in the opposite direction, it being understood that then the wing 70 is angularly positioned clockwise from its position shown in Figure 9 because the reversing clutch is engaged on the other side to effect the return movement.

There has thus been provided an improved mechanism which increases the utility of the trip mechanism without interfering with all of its present functions and makes possible the attainment of new results therewith.

What is claimed is:

1. In a trip control mechanism, the combination with a rotatable trip plunger mounted on a fixed support adjacent to a movable support and having an actuating wing projecting therefrom opposite to the direction of support movement, of means on the movable support for engaging and rotating said wing including a housing detachably connectable to the movable support, a trip pawl pivoted within said housing, spring pressed plungers mounted in said housing in engagement with opposite sides of said pawl for centralizing the position of said pawl normal to the direction of support movement, positive stop means for limiting lost motion movement of the pawl caused by engagement with said wing to effect rotary movement of said trip plunger, means responsive to rotary actuation of the trip plunger to stop said movable support, rotation of the wing releasing said pawl for automatic centralization by said spring plungers, whereby the trip plunger may be repositioned to start movement of the support in the same direction without interference between said pawl and said wing.

2. In a trip control mechanism, the combination with a rotatable trip plunger mounted on a fixed support adjacent to a movable support and detents for holding said plunger in a stop position and a running position, said plunger when in a running position having an actuating wing projecting therefrom opposite to the direction of support movement, means carried by the movable support for engaging and rotating said wing upon movement of the support including a housing detachably connected to the movable support, a trip pawl pivoted within said housing and projecting therefrom, spring pressed plungers mounted on opposite sides of said pawl in said housing for centralizing the position of said pawl normal to the direction of support movement, positive stop means for limiting lost motion movement of the pawl caused by engagement with said wing to effect rotary movement of the trip plunger from one detent position to the other, means responsive to actuation of the trip plunger to stop said movable support, final detenting of the plunger in its stop position releasing said pawl for centralization by said spring plungers whereby the trip plunger may be repositioned in its running position without interference between said wing and pawl.

3. In a trip control mechanism for a machine tool having a rotatable detented trip control plunger stationed by a movable support, means operatively connecting the plunger to a control clutch for starting and stopping support movement, a wing projecting from said plunger in the direction opposite to the direction of support movement, means carried by the movable support including a pivoted pawl, means holding the pawl normal to the path of support movement for engagement with said wing upon movement of said support, said engagement causing lost motion movement of said pawl, positive stop means for limiting said lost motion movement to cause rotation of the plunger, detent mechanism for completing said plunger rotation to effect disengagement of said clutch, completion of said rotation by the detent mechanism releasing said pawl whereby recentralization of said pawl by said resilient means will remove said pawl from the path of said wing permitting repositioning of the plunger in its running position.

4. A trip control mechanism for automatically disengaging the driving clutch of a machine tool support comprising a trip element stationed by said movable support and operatively connected to said clutch, an oscillatable trip pawl mounted on the support for movement therewith, said trip element having a wing projecting therefrom in a direction opposite to the direction of support movement and lying in the path of said pawl, said trip pawl in its normal position having a limited amount of lost motion upon engagement with said wing before effecting rotation thereof, detent mechanism associated with said trip element for continuing rotation thereof to a predetermined position to effect disengagement of said clutch whereby completion of said rotation will release said pawl, resilient means for returning said pawl to its normal position whereby said trip plunger may be repositioned to effect engagement of said clutch without interference between said wing and said pawl, and manual means for rotating said trip element.

5. A trip mechanism for controlling movement of a machine table relative to its support, combining a rotatable trip element stationed on said support, a tripping means for the trip element carried by the table, a clutch mechanism engageable by rotation of the trip element in one direction to cause movement of the table, said trip element having a laterally extending wing positionable in the path of said tripping means and extending in a direction opposite to the direction of support movement, said tripping means including a trip pawl having lost motion oscillation, resilient means on opposite sides of said pawl holding said pawl normal to the axis of table movement to engage said wing whereby movement of said table will cause said lost motion to be taken up and said trip element rotated, detent mechanism for completing rotation of said trip element to automatically disengage said clutch mechanism, said resilient means automatically acting to return said pawl to its normal position whereby reverse rotation of said trip element may be effected to engage said clutch without interference between said pawl and said wing.

References Cited in the file of this patent

UNITED STATES PATENTS

| Number | Name | Date |
|---|---|---|
| 1,390,706 | Hazelton | Sept. 13, 1921 |
| 1,695,359 | Bath | Dec. 18, 1928 |
| 1,727,424 | Archea | Sept. 10, 1929 |
| 2,063,414 | Tweddell | Dec. 8, 1936 |
| 2,393,923 | Nenninger et al. | Jan. 29, 1946 |
| 2,522,779 | Culkosky | Sept. 19, 1950 |